United States Patent
Richter et al.

(10) Patent No.: US 6,641,143 B2
(45) Date of Patent: Nov. 4, 2003

(54) MULTI-LINKED SEAL ASSEMBLY HAVING MATERIAL THAT SWELLS WHEN EXPOSED TO FIRE

(75) Inventors: James R. Richter, Lincolnshire, IL (US); Zbigniew K Bochenek, Burbank, IL (US); Jonathan Malakoff, Naperville, IL (US)

(73) Assignee: The Metraflex Company, Chicago, IL (US)

( * ) Notice: Subject to any disclaimer, the term of this patent is extended or adjusted under 35 U.S.C. 154(b) by 0 days.

(21) Appl. No.: 10/051,395

(22) Filed: Jan. 18, 2002

(65) Prior Publication Data

US 2003/0137112 A1 Jul. 24, 2003

(51) Int. Cl.⁷ .............................. F16L 21/05; F16L 5/02
(52) U.S. Cl. ................... 277/603; 277/606; 277/627
(58) Field of Search .......................... 277/603, 606, 277/626, 627, 628, 630, 650, 651

(56) References Cited

U.S. PATENT DOCUMENTS

| | | | |
|---|---|---|---|
| 3,528,668 A | | 9/1970 | Barton |
| 3,649,034 A | | 3/1972 | Barton |
| 3,703,297 A | | 11/1972 | Gignac |
| 4,018,983 A | * | 4/1977 | Pedlow ...................... 174/135 |
| 4,093,097 A | * | 6/1978 | Wszolek ..................... 215/349 |
| 4,221,092 A | * | 9/1980 | Johnson ....................... 52/232 |
| 4,266,039 A | * | 5/1981 | Hons-Olivier et al. ......... 521/85 |
| 4,622,436 A | | 11/1986 | Kinnan |
| 4,686,244 A | * | 8/1987 | Dietlein et al. ............. 521/179 |
| 4,945,015 A | | 7/1990 | Milner et al. |
| 4,952,615 A | * | 8/1990 | Welna ......................... 523/179 |
| 4,992,481 A | * | 2/1991 | von Bonin et al. ............ 521/54 |
| 4,993,724 A | | 2/1991 | Hauff |
| 5,011,163 A | * | 4/1991 | Hermann et al. ............ 277/653 |
| 5,094,780 A | | 3/1992 | von Bonin |
| 5,137,658 A | | 8/1992 | Stahl |
| 5,213,341 A | | 5/1993 | Griffiths |
| 5,247,005 A | | 9/1993 | von Bonin |
| 5,290,073 A | | 3/1994 | Chen |
| 5,340,123 A | | 8/1994 | Griffiths |
| 5,508,321 A | | 4/1996 | Brebner |
| 5,548,934 A | | 8/1996 | Israelson |
| 5,650,448 A | | 7/1997 | Wallace et al. |
| 5,697,194 A | | 12/1997 | Gignac et al. |
| 5,719,199 A | | 2/1998 | Wallace et al. |
| 5,759,659 A | * | 6/1998 | Sanocki et al. ................ 428/74 |
| 5,931,474 A | * | 8/1999 | Chang et al. ................ 277/316 |
| 6,336,297 B1 | * | 1/2002 | Cornwall ..................... 52/232 |
| 6,410,137 B1 | * | 6/2002 | Bunyan ....................... 428/356 |

* cited by examiner

Primary Examiner—Anthony Knight
Assistant Examiner—Michael J. Kyle
(74) Attorney, Agent, or Firm—Sonnenschein Nath & Rosenthal

(57) ABSTRACT

A multi-link seal assembly having material that swells when exposed to fire is provided. The multi-link seal assembly includes a plurality of seal blocks. Each seal block is made of a material that swells when exposed to fire, wherein the material consists of 2.4 weight percent expandable graphite, 6.6 weight percent brominated diphenyl oxide, 2.0 weight percent antimony trioxide, 16.8 weight percent carbon black, and remaining material to bring the total weight percent to 100 weight percent. Further, each seal block expands when the temperature reaches 300 degrees Celsius and forms a hard, crust-like barrier when exposed to fire. Each of the seal blocks are arcuate in shape such that when joined together to form a seal belt and unjoined ends of the seal belt are configured to be joined together to form a continuous ring. The continuous ring is configured to be disposed about a pipe.

4 Claims, 3 Drawing Sheets

MULTI-LINKED SEAL ASSEMBLY HAVING MATERIAL THAT SWELLS WHEN EXPOSED TO FIRE

RELATED APPLICATION DATA

This patent application is related to U.S. Non-Provisional Application No. 09/902,294, filed Jul. 10, 2001 and which is incorporated by reference to the extent permitted by law.

FIELD OF THE INVENTION

The present invention relates to seals, and particularly to a seal for a pipe extending through a wall.

BACKGROUND INFORMATION

Buildings and other structures are supported by a variety of services, such as water, gas, electric, and sewer. Conventionally, these services are distributed throughout the building by pipes. As hollow cylinders used to conduct a liquid, gas, wiring and the like, these pipes or conduits penetrate the floors, ceilings, and walls of most buildings.

Wherever a pipe penetrates the floor, ceiling, or wall (collectively, wall), it is desirable to install a seal assembly within a gap between the pipe and the wall. Here, gap seal assemblies allow longitudinal and radial movement of a pipe located in a partition wall. This is important during installation of the pipe. For example, when a pipe thermally expands or contracts, it is important that the seal is not dislodged from the wall.

After installation, gap seal assemblies also serve as fire stops. When fire develops in one room of a building, the fire will spread to adjoining rooms through any open orifice or gap. Thus, conventional gap seal assemblies employ fire resistant caulk to fill the gap between the wall and the pipe. However, there are numerous disadvantages to using caulk.

Caulk may take up to twelve days to cure and, correspondingly, twelve days to meet building fire codes. The thickness of caulk may vary and air bubbles may become trapped in it, affecting the fire rating. Caulk is not waterproof, cannot be installed in cold weather, and is messy when installed in ordinary and hot weather. Moreover, a worker must install caulk from both sides of the wall, which increases the number of work hours needed to complete a pipe installation job. Further, it is difficult to control the amount of caulk applied for each seal assembly, thus setting up a construction job that inevitably will result in waste. In addition, caulk hardens over time and becomes dislodged due to vibration.

SUMMARY OF THE INVENTION

In light of the above noted problems, the present invention works towards providing a multi-link seal assembly having material that swells when exposed to fire to create a fire stop seal. This eliminates many of the problems associated with the use of caulk. Moreover, since the seal assembly need not be tightened to the degree of conventional seals to create a fire stop seal, its installation time is reduced.

In a preferred embodiment, the multi-link seal assembly includes a plurality of seal blocks and a plurality of plates. The plurality of plates are integrally connected to the seal blocks to form a seal belt. The seal belt may be placed around a pipe and installed into a gap between a wall and a pipe. Each seal block is made of a material consisting of 2.4 weight percent expandable graphite, 6.6 weight percent brominated diphenyl oxide, 2.0 weight percent antimony trioxide, 16.8 weight percent carbon black, and other material to bring the total weight percent to 100 weight percent. Each seal block is configured to expand when a temperature adjacent to each seal block reaches 300 degrees Celsius. Moreover, each seal block is configured to form a hard, crust-like barrier when exposed to fire.

These and other features and advantages of the present invention will become apparent upon a reading of the detailed description and a review of the accompanying drawings. Specific embodiments of the present invention are described herein. The present invention is not intended to be limited to only these embodiments. Changes and modifications can be made to the described embodiments and yet fall within the scope of the present invention.

DETAILED DESCRIPTION OF THE PREFERRED EMBODIMENTS

Figure 1:
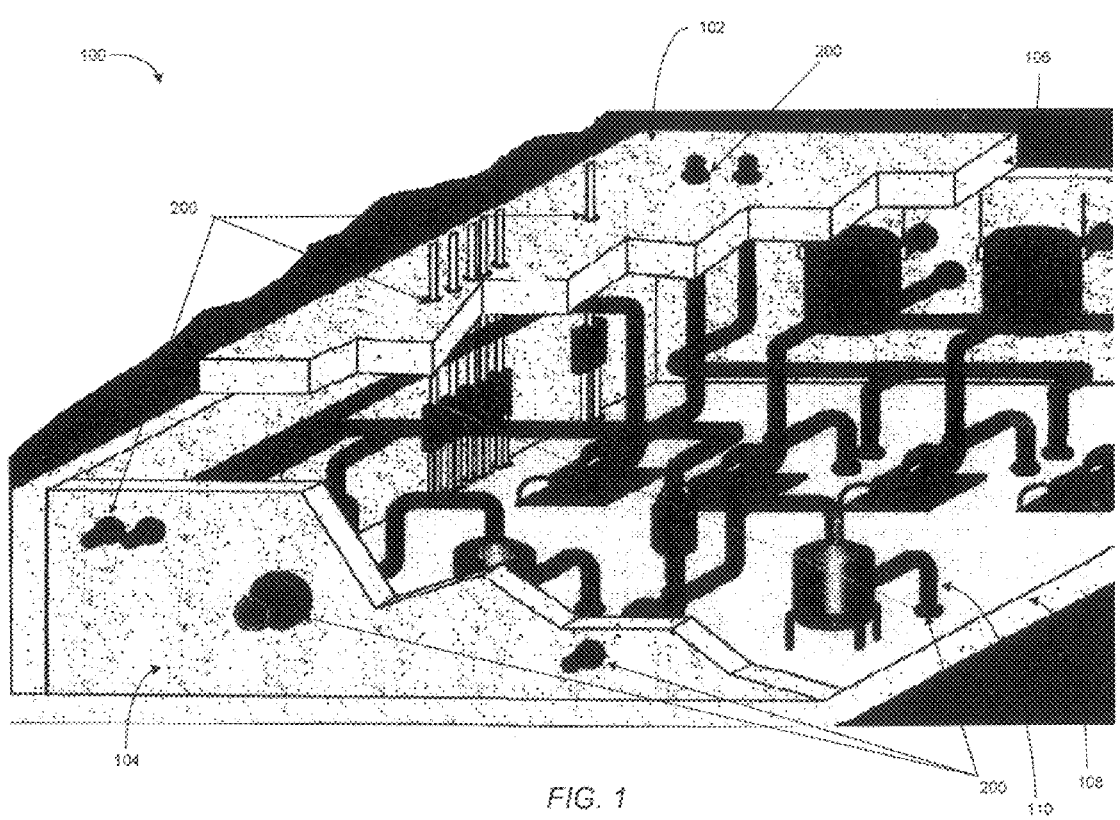
FIG. 1 is a schematic isometric sectional view of a system 100.

FIG. 1 is a schematic isometric sectional view of a system 100. The system 100 may include a building 102. The building 102 may be any structure held or put together in a particular way. In one embodiment, the building 102 may include a wall 104, a ceiling 106, and a floor 108. Four walls 104 may adjoin one another on the floor 108 to extend up to the ceiling 106. The ceiling 106 may also be a floor and the floor 108 may also be a ceiling or a foundation.

The system 100 may further include a pipe 110. The pipe 110 may be any structure that penetrates into another structure. In an alternate embodiment, the pipe 110 may be a solid or hollow enclosure or cylinder. In a further embodiment, the pipe 110 may be used to conduct a liquid, gas, wiring and the like. Where each pipe penetrates into or through the wall 104, the ceiling 106, or the floor 108, the system 100 further may include a seal assembly 200.

Although a building 102 is shown in the system 100, the system 100 may be any location where a cylindrically shaped object penetrates through a structure. The system 100 may be an oil platform that employs core-drilled applications, for example. Moreover, the system 100 may be located in a commercial, industrial, or residential setting.

Figure 2:
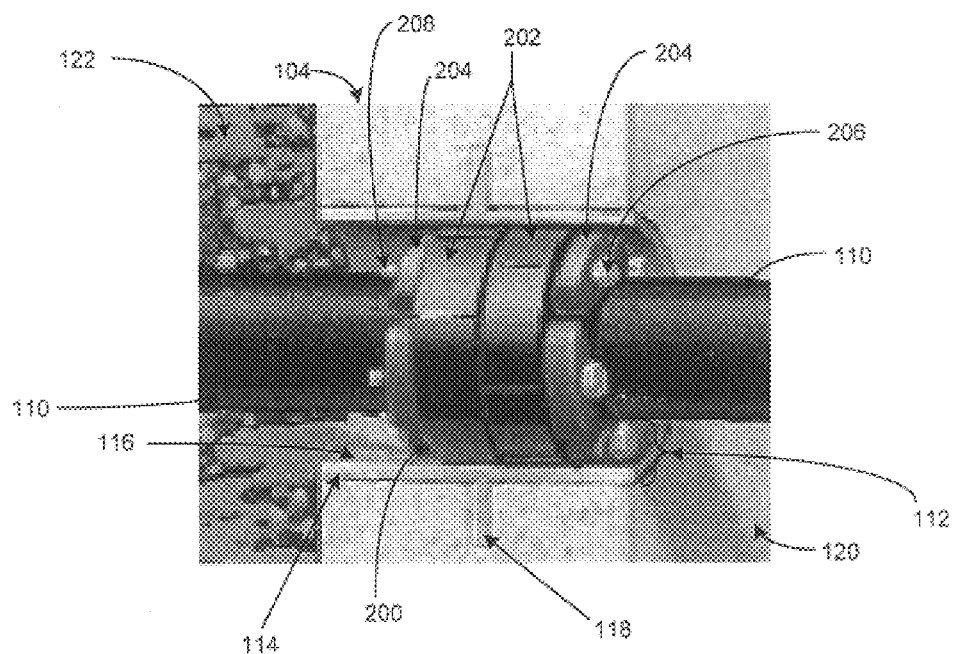
FIG. 2 is a schematic side sectional view of the seal assembly 200, partially in elevation and installed in the wall 104.

FIG. 2 is a schematic side sectional view of the seal assembly 200, partially in elevation and installed in the wall 104. An opening or gap 112 in the wall 104 may be prepared by installing a pipe sleeve 114. The pipe sleeve 114 may provide a consistent, known registration surface 116 against which the seal assembly 200 may reside. In one embodiment, the pipe sleeve 114 may include a water stop 118 that extends radially outward from an exterior surface of the pipe sleeve 114. The water stop 118 may secure the pipe sleeve 114 to the wall 104 as well as provide a labyrinth that works to prevent the movement of gas or liquid between the wall 104 and the pipe sleeve 114.

The wall 104 may define a first compartment 120 and a second compartment 122. The seal assembly 200 may be positioned in the pipe sleeve 114 so as to separate the first compartment 120 from the second compartment 122. This separation may be important where one of the compartments, such as the second compartment 122, contains a hazard such as fire, gas, water, odor, noise, vibration, and the like.

In a preferred embodiment, the seal assembly 200 is an improvement to the METRASEAL® seal assembly that has been available from the Metraflex Company (Chicago, Ill.) for a number of years. In particular, the improvement to the METRASEAL® seal assembly resides in the use of a material that swells when exposed to one or more elements, such as a particular gas, a particular liquid, vibration such as from an earthquake, or heat from a fire. The structure of the METRASEAL® seal assembly, which is illustrated in a number of Metraflex brochures and at www.metraflex.com, is fully incorporated by reference to the extent permitted by law. Metraflex Company is the assignee of the present invention and to U.S. Non-Provisional Application No. 09/902,294. Moreover, at the time the present invention was made, U.S. Non-Provisional Application No. 09/902,294 and the present invention were subject to the obligation of assignment to the assignee of U.S. Non-Provisional Application No. 09/902,294.

As seen in FIG. 2, the seal assembly 200 may comprise a plurality of seal blocks 202, a plurality of plates 204, and a bolt 206 and a nut 208 for each set of two plates 204. The plate 204 may be thought of as a pressure plate. As discussed more fully below, the seal blocks 202 may be hinged to one another by the bolts 206 so as to create a flexible series of links. When each seal block 202 is hinged to two adjacent seal blocks 202, the collective may form a bounded region into which the pipe 110 may fit. If only two adjacent seal blocks 202 are not hinged to one another, the resulting structure may be referred to as a seal belt as in FIG. 3.

Figure 3:
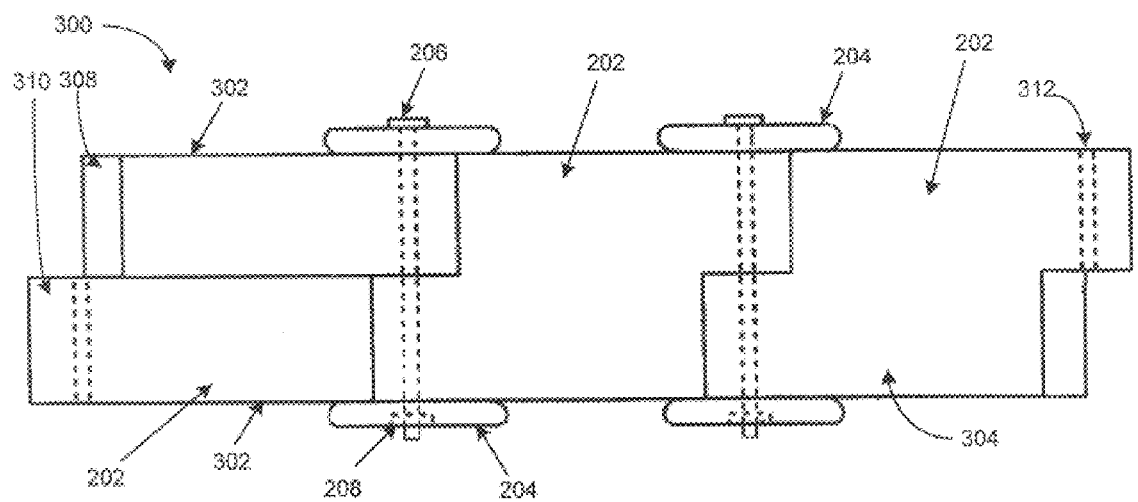
FIG. 3 is a schematic side view of the seal belt 300.

FIG. 3 is a schematic side view of the seal belt 300. As seen, the seal block 202 may be one solid piece. However, it has been found that it is more economical to create a singular modular piece for which two of such pieces may be fixed to one another to form a seal block 202. In one embodiment, the seal block 202 may comprise two longitudinal sections 302.

Figure 4:
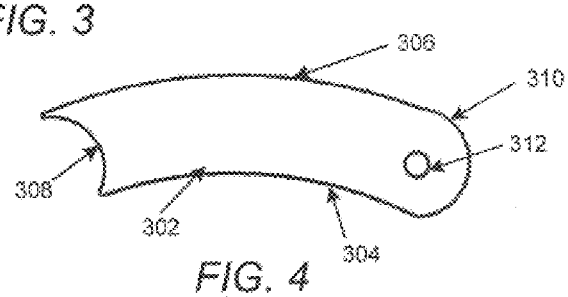
FIG. 4 illustrates a plan view of the longitudinal section 302.

FIG. 4 illustrates a plan view of the longitudinal section 302. The longitudinal section 302 may comprise an interior surface 304, an exterior surface 306, a concave end 308, and a convex end 310. Both the interior surface 304 and the exterior surface 306 may be disposed between the concave end 308 and the convex end 310, wherein the longitudinal section 302 may be arcuate in shape. The convex end 310 may further comprise a hole 312. The hole 312 may extend through the longitudinal section 302 so that the bolt 206 may be passed through the hole 312. A friction-reducing layer, such as a wire mesh, may be disposed on the inner surface 304.

Each of the seal blocks 202 may be arcuate in shape. The seal blocks 202 may be joined together to form the seal belt 302 having two unjoined ends as seen in FIG. 3. When the two unjoined ends of the seal belt 302 are joined together, they may complete a continuous ring to form the seal assembly 200 as seen in FIG. 5.

Figure 5:
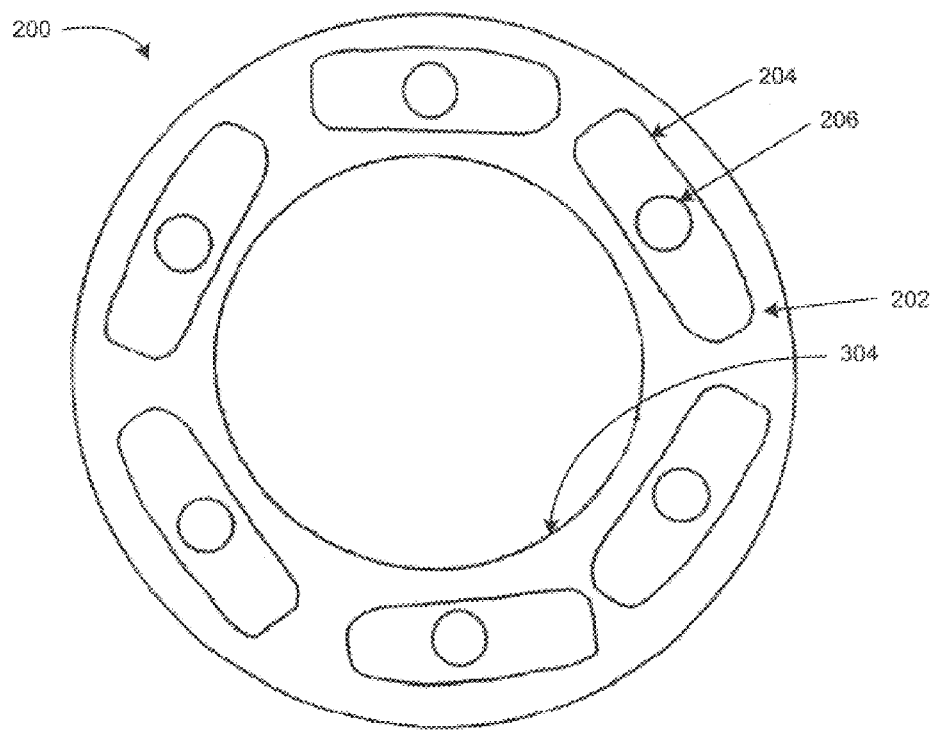
FIG. 5 illustrates a plan view of the seal assembly 200.

FIG. 5 illustrates a plan view of the seal assembly 200. Each seal block 202 may be disposed between two plates 204 for each bolt 206. When the collective of the interior surfaces 304 are disposed adjacent to one another, they may form, as a bounded region, a continuous ring into which the pipe 110 may fit.

The seal block 202 may be made of a material that swells when exposed to one or more elements, such as a particular gas, a particular liquid, vibration, or heat from a fire. In a preferred embodiment, the seal block 202 expands when the temperature adjacent to the seal block 202 reaches approximately 300 degrees Celsius. The material for the seal block 202 additionally may form a hard, crust-like barrier when exposed to fire. This hard barrier may work towards holding back a fire and water to minimize damage.

The seal block 202 material may be flexible and include one or more of the following properties: workable in damp conditions, ultraviolet (UV) light resistant, ozone resistant, sunlight resistant, water resistant, waterproof, fire resistant, fireproof, instantaneous cure time (no drying or cure time) to instantly meet relevant building codes, and chemical resistant. When used in a seal assembly 200 the seal block 202 may contribute to an approximately 52% reduction in noise amplitude when compared to the use of caulk under similar circumstances.

When used in a seal assembly 200, the seal block 202 may contribute to at least approximately a one-hour fire protection rating. The fire protection rating may also be approximately a two-hour fire rating. For example, for a metallic pipe drilled hole per the Underwriter Laboratories (UL) classification C-AJ-1373, the fire rating may be approximately two hours for annular gaps 112 under approximately 1 3/16 inches, and approximately 1.5 hours for annular gaps 112 over approximately 1 3/16 inches. For a metallic pipe sleeved hole per UL Classification C-AJ-1374, the fire rating (F-rating) may be approximately two hours for annular gaps 112 under approximately 1 3/16 inches, and approximately 1.5 hours for annular gaps 112 over approximately 1 3/16 inches. For polyvinyl chloride (PVC) or chlorinated polyvinyl chloride (CPVC) rigid, non-metallic conduit per UL Classification C-AJ-2328, the fire rating may be approximately two hours for an approximately 1.25 inch pipe and smaller, and approximately one hour for pipe diameters of approximately 1.5 inches to 2.0 inches.

The seal block 202 (including the longitudinal section 302) may be made from an expandable graphite and rubber composition. In particular, the seal block 202 may be made from a combination of expandable graphite, a flame retardant, a smoke suppressant, carbon black, and remainder materials that bring the combination to a predetermined weight or predetermined distribution of weight percentages. The remainder material may include a rubber composition, such as Ethylene Propylene Diene Monomer (EPDM), and may include sulfur, plasticizers, and tacifiers. In one embodiment, the seal block 202 may be made from the formula in Table I below (kg is an abbreviation for kilograms):

TABLE I

| Approx. Quantity | Units | Approx. % | Material |
|---|---|---|---|
| 0.244 | kg | 2.4 | Expandable graphite |
| 0.660 | kg | 6.6 | Flame retardant |
| 0.200 | kg | 2.0 | Smoke suppressant |
| 1.684 | kg | 17.0 | Carbon black |
| 7.272 | kg | 72.0 | Remainder (balance) |
| 10.000 | kg | 100.00 | Total |

A. Expandable Graphite

Graphite is a soft, steel-gray to black, hexagonally crystallized allotrope of carbon with a metallic luster and a greasy feel that is chemically inert and capable of withstanding both high temperatures and corrosive environments. Expandable graphite is a kind of graphite product generated from natural scale graphite by special treatment. Insoluble in water, the expandable graphite may appear from gray to black and have a slight acidic odor.

In one embodiment, the seal block 202 with the expandable graphite may begin to lose its stability and begin to expand at approximately 150 degrees Celsius. When exposed to a temperature of at least approximately 300 degrees Celsius, the seal block 202 with the expandable graphite may expand to 150–250 times its original volume. For high temperature applications, the seal block 202 may begin to expand at approximately 350 degrees Celsius and expand to full volume at approximately 500 degrees Celsius. In another embodiment, the expandable graphite may define a specific gravity of approximately 2.20 to 2.35.

B. Flame Retardant

The flame retardant used in the seal block 202 may be any material that works towards preventing the spread of fire, such as by not supporting combustion. In one embodiment, the melting point of the flame retardant may be greater than approximately 300 degrees Celsius. In another embodiment, the flame retardant may include a specific gravity of approximately 3.3. In a different embodiment, the flame retardant may be a brominated flame retardant, such as brominated diphenyl oxide. Preferably, the frame retardant includes more than 50 weight percent of decarbomodiphenyl oxide.

C. Smoke Suppressant

The smoke suppressant used in the seal block 202 may be any material that works to suppress the generation of smoke. Preferably, the smoke suppressant includes at least one of antimony trioxide and zinc borate. Antimony trioxide, $Sb_2O_3$, is a white, odorless, crystalline powder that melts at 655 degrees Celsius, is insoluble in water, and works as a powerful reducing agent. In one embodiment, the smoke suppressant comprises at least approximately 75 weight percent of antimony trioxide.

D. Carbon Black

Carbon black is an important ingredient in mechanical rubber goods that improves strength, durability and overall performance. The carbon black used in the seal block 202 may be a black, fluffy, extremely fine, odorless powder. In its pure form, carbon black can only be ignited with difficulty and will burn slowly.

E. Remainder (balance)

As noted above, the remainder material may include a rubber composition, such as Ethylene Propylene Diene Monomer, and may include sulfur, plasticizers, and tacifiers. The rubber composition may work to allow the material to continually move in all directions once expansion of the seal block 202 begins due to heat. Sulfur is a pale yellow nonmetallic element occurring widely in nature in several free and combined allotropic forms and may be used in rubber vulcanization. The plasticizers used in the seal block 202 may include any of various substances added to plastics or other materials to make or keep them soft or pliable. The tacifiers use in the seal block 202 may be any substance that aids in holding or binding the remaining ingredients together.

Figures 6, 7, 8:
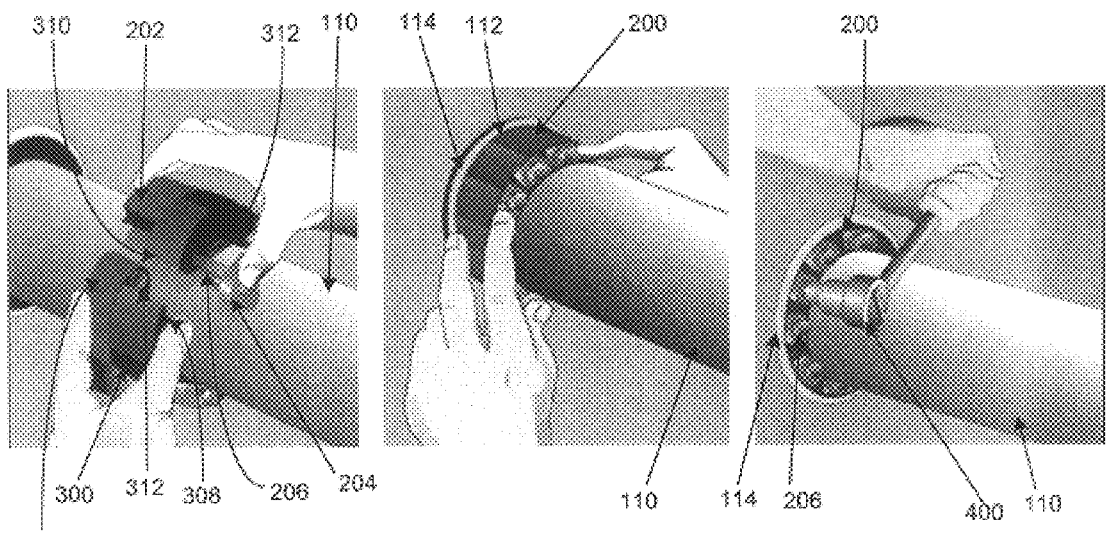
FIG. 6, FIG. 7, and FIG. 8 illustrate a method to install the seal belt 300 around the pipe 110.

FIG. 6, FIG. 7, and FIG. 8 illustrate a method to install the seal belt 300 around the pipe 110. As seen in FIG. 6, the seal belt 300 may be wrapped around the pipe 110. Adjacent seal blocks 202 may be connected by placing the bolt 206 through the plate 204 and the holes 312 so that the convex end 310 mates with the concave end 308. This forms the seal assembly 200 seen in FIG. 7. The seal assembly 200 may then be slid into the gap 112 formed between the pipe 110 and the pipe sleeve 114.

With the seal assembly 200 between the pipe 110 and the pipe sleeve 114 as shown in FIG. 8, each bolt 206 may be tightened through the use of a tool 400. The tightening of each bolt 206 preferably is gradual and sequential. To gradually tighten each bolt 206, each bolt may be turned approximately two to three turns so that approximately five to nine passes completely around the pipe 110 may be needed to tighten the bolts 206. The tightening of each bolt 206 works to compress each set of two plates 204 so as to place each seal block 202 under pressure.

In conventional seal assemblies, the bolts would need to be tightened so as to compress each seal block in an attempt to create a fire stop seal in addition to creating a gas and watertight seal. Since the seal blocks 202 employ the material of the invention, the bolts 206 need not be tightened to create a fire stop seal. In other words, the seal assembly 200 need not be tightened to the degree of conventional seals to create a fire stop seal. Rather, the bolts 206 need only be tightened to create a gas and watertight seal. This saves time and wear and tear on the seal assembly 200.

In operation, where heat in the second compartment 122 of FIG. 1 reaches a predetermined level, the material of each seal block 202 may begin to swell. As the material swells, it may expand to further seal the gap 112 such as by extending in the direction of the pipe 110. As the swelling material reaches an end of the pipe sleeve 114, it may mushroom outward to form a lip on an exterior of the wall 104. This mushroom lip may extend from the pipe 110 to a radial position that may be beyond the gap 112. Moreover, either due to a rise in heat, the existing temperature of the heat, or a combination thereof, the surface of the expanded seal block 202 exposed to the heat may form a hard, crust-like barrier. This hard, crust-like barrier may continue to grow from the exposed surface back into the gap 112 along .the pipe 110. The effect is to create a fire stop that prevents the transmission of heat or fire from the second compartment 122 to the first compartment 120.

The present invention has been described utilizing particular embodiments. As will be evident to those skilled in the art, changes and modifications may be made to the disclosed embodiments and yet fall within the scope of the present invention. The disclosed embodiments are provided only to illustrate aspects of the present invention and not in any way to limit the scope and coverage of the invention. The scope of the invention is therefore only to be limited by the appended claims.

What is claimed is:

1. A multi-link seal assembly having material that swells when exposed to fire, the multi-link seal assembly, comprising:
   (a) a plurality of seal blocks, each seal block having a bolt hole extending therethrough, wherein each seal block is made of a material that swells when exposed to fire, wherein the material consists of 2.4 weight percent expandable graphite, 6.6 weight percent brominated diphenyl oxide, 2.0 weight percent antimony trioxide, 16.8 weight percent carbon black, and remaining material to bring the total weight percent to 100 weight percent, wherein each seal block is configured to expand when a temperature adjacent to each seal block reaches 300 degrees Celsius, and wherein each seal block is configured to form a hard barrier when exposed to fire and fully expanded;

(b) a bolt positioned in each bolt hole to secure adjacent seal blocks together;

(c) a nut fixed to an end of each bolt; and (d) a plate positioned at an exposed end of each bolt hole for the bolts to pass through such that a tightening of the bolts will cause the bolts to screw within the nuts so as to compress the seal block therebetween and to cause the seal blocks to expand in a direction perpendicular to an axis of the bolts, (e) wherein each of the seal blocks are arcuate in shape such that when joined together to form a seal belt having two unjoined ends, wherein the two unjoined ends of the seal belt are configured to be joined together to form a continuous ring, and wherein the continuous ring is configured to be disposed about a pipe.

2. The multi-link seal assembly of claim 1, wherein the remaining material comprises a rubber composition.

3. The multi-link seal assembly of claim 2, wherein rubber composition comprises Ethylene Propylene Diene Monomer (EPDM).

4. The multi-link seal assembly of claim 3, wherein the remaining material further comprises at least one of sulfur, plasticizers, and tacifiers.

* * * * *